REWIND METHOD AND APPARATUS
Filed March 11, 1966
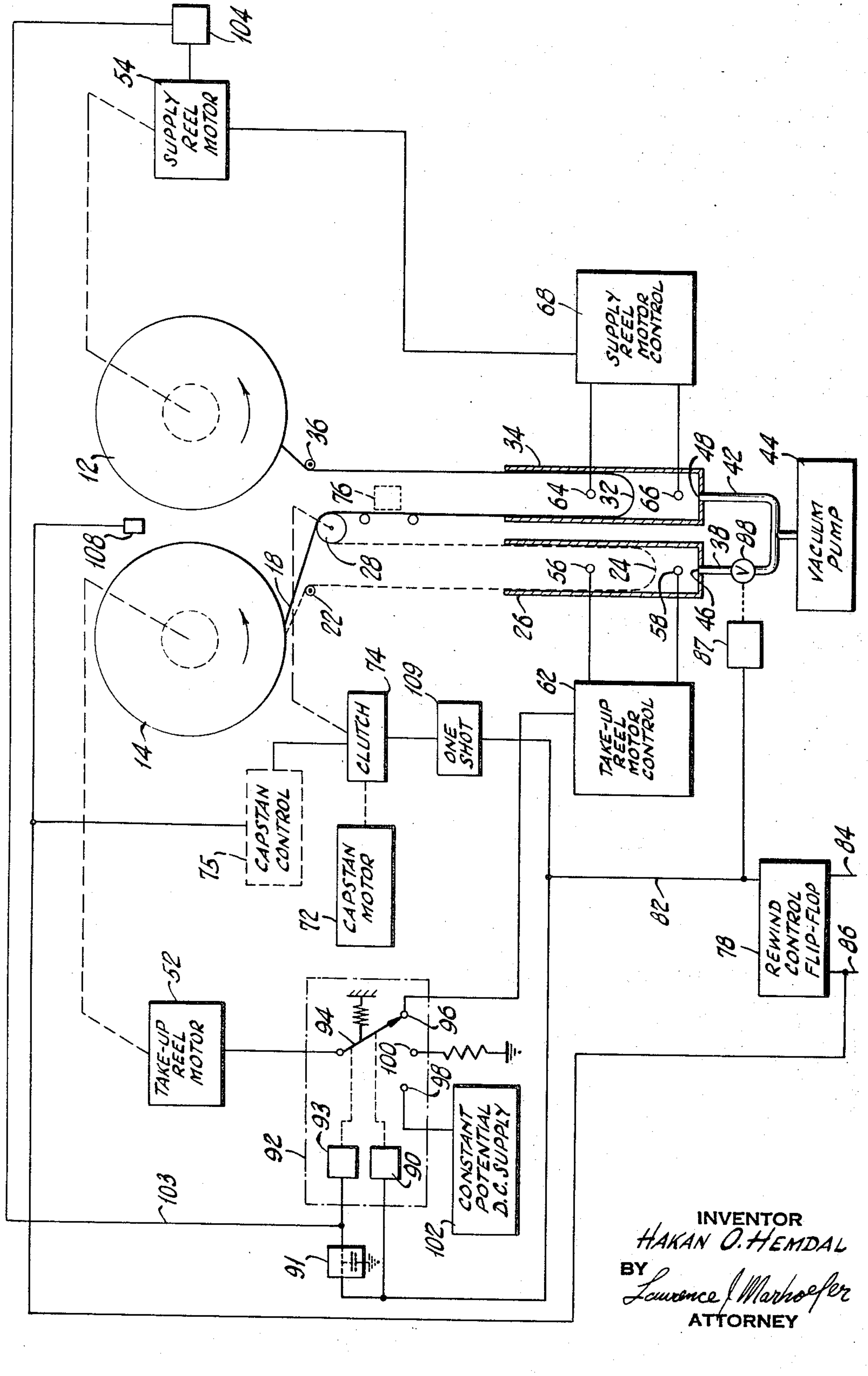
INVENTOR
HAKAN O. HEMDAL
BY Lawrence J. Markoefer
ATTORNEY

United States Patent Office 3,343,758

Patented Sept. 26, 1967

3,343,758

REWIND METHOD AND APPARATUS

Hakan O. Hemdal, Huntington, N.Y., assignor to Potter Instrument Company, Inc., Plainview, N.Y., a corporation of New York Filed Mar. 11, 1966, Ser. No. 533,662
7 Claims. (Cl. 242—55.12)

This invention, generally, relates to an improved method and apparatus for rewinding tape in a tape transport in which buffering tape loops are formed in vacuum chambers located on either side of a capstan, and more particularly, to an improved rewinding method and apparatus which rapidly packs the tape uniformly and tightly on a reel.

In a tape transport which employes vacuum chambers for forming buffering loops of tape on either side of a capstan, usually, the capstan drives the tape past a transducer in one direction only when recording information on the tape or reading information therefrom. The tape is paid out by a supply reel and taken up by a take-up reel. Thus, to re-read or re-record a section of tape or an entire tape, the tape must be rewound onto the supply reel.

In the prior art, one method for rewinding the tape is a so-called reel-to-reel method. In this method, the tape is pulled out of both vacuum chambers completely. The supply and take-up reel motors then are energized, and the tape is wound directly from the take-up reel back to the supply reel.

In an alternative method known in the prior art, the tape loops remain in the vacuum chambers, and the capstan drives the tape from the take-up reel onto the supply reel. The supply reel and take-up reel motors are operated as in the normal operating mode for the transport.

Other rewinding methods also are known in the prior art, but these methods are relatively complex and expensive or are limited to a particular type of transport, such as a transport employing a vacuum capstan.

With the reel-to-reel rewind method, it is difficult to maintain sufficient uniform tension on the tape while rewinding, resulting in non-uniform, loose packing of the tape on the supply reel. Furthermore, the tape is broken sometimes in removing it from the vacuum chambers or in stopping the rewinding operation.

In order to rewind a tape rapidly by means of the capstan, a variable speed capstan must be employed. The provision of such a capstan increases the cost of a transport.

One object of this invention is to provide an improved method for rewinding information on storage tape by means of which the tape can rewind rapidly without complex or expensive apparatus.

Another object of this invention is the provision of a rapid rewinding method which packs the tape tightly and uniformly onto the supply reel.

A further object of this invention is the provision of a method and apparatus for rapidly rewinding information storage tape without abnormally stressing the tape.

An additional object of this invention is to provide a method and apparatus for rewinding information storage tape in which the tape is positioned quickly and simply for rewinding and is returned to position quickly and simply for normal operation after rewinding is completed.

Briefly, this invention contemplates a rewinding method in which the tape is removed completely from the take-up reel vacuum chamber, and maintained in the supply reel vacuum chamber during the rewinding operation. The supply and take-up reel motors are energized, and the tape is rewound from the take-up reel to the supply reel with the tape loop sensors in the supply reel vacuum chamber controlling the speed of the supply reel motor. The tension on the tape being wound onto the supply reel thus is maintained constant, and the tape packs tightly and uniformly onto the supply reel.

These and other objects and advantages of the present invention will be apparent from the following detailed description of a preferred embodiment of the invention taken in conjunction with the accompanying drawing wherein the single figure is a front elevation of a tape transport showing, partially in block diagram and partially schematically, apparatus for rewinding an information storage tape in accordance with one embodiment of this invention.

Referring now to the drawing, a tape transport of the type to which the invention is applicable, has a supply reel 12 and a take-up reel 14 rotatably mounted on a suitable chassis. While the transport is operating in the information recording and reading modes, a tape 18 extends from the take-up reel 14 over a guide roller 22 and forms a loop 24 (shown dotted) in a vacuum chamber 26 associated with the take-up reel. Leaving the vacuum chamber 26, the tape 18 wraps around and frictionally engages a capstan 28, then forms a loop 32 in a vacuum chamber 34 associated with the supply reel. Leaving the vacuum chamber 34, the tape 18 passes over a guide roller 36 and onto the supply reel 12.

A vacuum pump 44, which is coupled to vacuum chambers 26 and 34 by ducts 38 and 42, respectively, withdraws air from bottom of the chambers 26 and 34 and maintains a suction on the tape loops 24 and 32.

As will be appreciated by those skilled in the art, in the reading and recording modes, the rotational speeds of reels 12 and 14 must be controlled so that they respectively pay-out and take-up the tape 18 at approximately the same rate that the tape is moved past a transducer 76 by the capstan 28. To this end, a take-up reel control circuit 62 is used to control the energization of a take-up reel motor 52. Similarly, take-up up reel control circuit 68 is used to control the energization of a supply reel motor 54. Control circuit 62 is responsive to the outputs of a pair of sensors 56 and 58 in chamber 26, which sense the position of the end of loop 24 in that chamber. Control circuit 62 is responsive to the outputs of a pair of sensors 64 and 66 in chamber 34, which sense the position of the end of loop 36 in chamber 34. A preferred control system is disclosed in the co-pending application of Andrew Gabor, Ser. N. 498,379, filed Oct. 20, 1965 and entitled Storage Tape Transport and Motor Control System.

Briefly, in the Gabor system, when the tape loop rises above an upper sensor 56 or 64 in one of the chambers, a control circuit causes the reel associated with the chamber to rotate in a direction to feed tape into the chamber. When the tape loop drops below a lower sensor 58 or 66, a control circuit causes the reel associated with the chamber to rotate in a direction to withdraw the tape from the chamber. When a loop is between a pair of sensors, the associated reel is electrodynamically braked.

A motor 72, drives the capstan 28 by means of a reversible electromagnetic clutch 74, which is controlled by a suitable capstan control circuit 75 known in the art.

For rapidly rewinding the tape 18, in accordance with the teachings of this invention, there is a flip-flop circuit 70 which has an output lead 82, a rewind command input lead 84 and a reset input lead 86. Conveniently, an input pulse on lead 84 switches flip-flop 78 to a first stable state in which lead 82 is at a positive potential, and an input on lead 86 switches the flip-flop to a second stable state in which lead 82 rests at ground potential. The input signal on lead 84 may be generated manually or by a suitable marker on the tape 18, as is well known in the art.

In rewinding the tape, loop 24 is initially removed from chamber 26 by destroying the vacuum in this chamber by means of a solenoid operated valve 88 in duct 38. Valve 88 is normally in a non-blocking (open) position, allowing pump 44 to such air from vacuum chamber 26. When the solenoid is energized by a positive potential on lead 82, valve 88 closes, blocking the passage of air through duct 38. Air leaking past the tape thereafter quickly destroys the vacuum in chamber 26.

A switch 92 is provided to disconnect the motor 52 from the control circuit 62 and connect it to a constant D.C. potential 102 during rewind. Switch 92 comprises an arm 94, terminals 96, 98 and 100 and two solenoids 90 and 93. Lead 82 is coupled directly to solenoid 90 and is connected through a time delay circuit 91 to solenoid 93. In a reading or recording mode, the solenoids 90 and 93 are not energized, and arm 94 contacts terminal 96, connecting the control circuit 62 to motor 52. A positive potential on lead 82 initially energizes solenoid 90, pulling arm 94 into contact with grounded contact 100. After a short delay the positive potential on lead 82 also energizes solenoid 93, pulling arm 94 into contact with terminal 98, thereby connecting motor 52 to the direct current potential source 102, which is of suitable polarity to rotate the take-up reel 14 in a counterclockwise direction. It will be appreciated that motor 52 rotates at a constant speed when connected to constant potential source 102. If desired, other suitable apparatus known in the art may be used for controlling the speed of take-up reel 14 during rewind.

A lead 102 couples the output on lead 82, after it is delayed by delayed circuit 91, to a switch 104 which, when energized, couples a suitable resistor in series with the field winding of motor 54. As will be appreciated by those skilled in the art, the resistor in series with the field winding of motor 54 increases the speed of the motor for a given armature potential.

The reset input lead 86 is coupled to a low tape sensor 108, such as a photoelectric cell, which generates an output signal to switch control circuit 78 to its second stable state when the tape on take-up reel 14 is less than a predetermined amount.

In operation, to rapidly wind the tape 18 from reel 14 onto the supply reel 12, a rewind command signal is applied to lead 84. An output signal on lead 82 closes the valve 88, releasing the vacuum in chamber 26. Preferably, the output on lead 82 is also coupled to the input of a one-shot multivibrator 109 which engages the clutch 74 and rotates the capstan in a clockwise direction for a predetermined interval in order to remove the tape 18 from the vacuum chamber 26. After this predetermined interval, the clutch 74 is no longer energized and the capstan 28 is able to turn freely. The position of the tape 18 after it has been removed from chamber 26 is shown in the full line drawing of the tape in the FIGURE. It should be noted that the tape does not tightly engage the capstan 28 and can freely slide past it.

The output on lead 82, which is coupled to solenoid switch 92, initially disengages arm 94 from terminal 96 and connects the armature of motor 52 to ground through a resistor, thereby inhibiting the rotation of reel 14. After an interval sufficient to allow the withdrawal of loop 24 from chamber 26, solenoid 93 pulls arm 94 into contact with terminal 98, thereby connecting the armature of motor 52 to constant potential supply 102. Reel 14 is driven in a counterclockwise direction at a constant speed feeding tape into vacuum chamber 34. The tape 18 initially feeds from take-up reel 14 rapidly owing to the large diameter of the tape wound on this reel, and loop 32 drops below the lower sensor 66. Controller 68 energizes motor 54 to rotate supply reel 12 in a counterclockwise direction at a sufficiently rapid rate, due to the resistor inserted in its field, to maintain the end of the loop just above the sensor 66. As more and more tape is wound onto reel 12, control circuit 68, in response to output signal from sensors 64 and 66, slows the reel 12 and continuously adjusts its speed to match the rate at which tape is fed from reel 14.

Preferably, when photocell 90 senses that there is only a small, predetermined amount of tape remaining on take-up reel 14, it produces an output signal which is coupled to reset input lead 86, switching rewind control circuit 78 to its second stable state in which lead 82 rests at ground. Valve 88 opens and the tape 18 is sucked into the vacuum chamber 26 reforming loop 24. Solenoids 90 and 94 are de-energized and arm 94 returns to contact terminal 96, coupling control circuit 62 to the motor 52. Switch 104 is de-energized, disconnecting the resistor in series with the reel winding of motor 54.

The output of low tape sensor 90 is also coupled to the capstan clutch control circuit 75, the output of which energizes clutch 72 so as to produce clockwise rotation of capstan 28. The remainder of the tape on take-up reel 14 is then rewound onto supply reel 12 by the capstan 28. When a beginning of tape marker on tape 18 is detected, the reels 12 and 14 are braked in a manner well known in the art and the transport is ready for reading or recording information on the tape 18.

This invention may be variously modified and embodied within the scope of the subjoined claims.

What is claimed is:

1. A method for rewinding an information storage tape which extends from a first reel, forms a loop in a first buffer, passes a capstan, forms a loop in a second buffer, and extends to a second reel, comprising the steps:
   - removing the tape from one of said buffers,
   - maintaining the tape in the other of said buffers, and
   - rotating said first reel in a direction to withdraw tape from said other buffer.

2. A method for rewinding an information storage tape as in claim 1, wherein said tape is removed from said second buffer and maintained in said first buffer.

3. A method for rewinding an information storage tape as in claim 2 including the additional step of controlling the rotation of said reel in response to the position of the loop in said first buffer.

4. A method for rewinding an information storage tape as in claim 3 including the additional step of increasing the maximum speed of said first reel while rewinding above the maximum speed of said first reel while recording and reading information on said tape.

5. A method for rewinding an information storage tape as in claim 4 including the additional step of returning said tape to said second buffer shortly before said tape is completely rewound on said first reel.

6. Apparatus for rewinding a tape in a tape transport in which the tape extends from a first reel, loops into a first vacuum column, passes a capstan, loops into a second vacuum column, and extends to a second reel, comprising in combination:
   - means for removing the tape from said second vacuum column,
   - means for maintaining said tape in said first vacuum column,
   - means for rotating said first reel in a direction to withdraw tape from said first column, and
   - means for rotating said second reel in a direction to feed tape into said first column.

7. Apparatus as in claim 6 wherein said means for maintaining said tape in said second column includes means responsive to the position of the tape loop in said first vacuum column for controlling the rotation of said first reel.

References Cited

UNITED STATES PATENTS

| | | | |
|---|---|---|---|
| 3,202,373 | 8/1965 | Reader | 242—55.12 |
| 3,302,900 | 2/1967 | Messamer | 242—55.12 |

LEONARD D. CHRISTIAN, *Primary Examiner.*

UNITED STATES PATENT OFFICE
CERTIFICATE OF CORRECTION

Patent No. 3,343,758 September 26, 1967

Hakan O. Hemdal

It is hereby certified that error appears in the above numbered patent requiring correction and that the said Letters Patent should read as corrected below.

Column 4, line 40, after "said" insert -- first --.

Signed and sealed this 15th day of October 1968.

(SEAL)
Attest:

Edward M. Fletcher, Jr.
Attesting Officer

EDWARD J. BRENNER
Commissioner of Patents